(12) United States Patent
Nitta

(10) Patent No.: US 9,064,199 B2
(45) Date of Patent: Jun. 23, 2015

(54) RFID TAG FOR FLEXIBLE MATERIAL PRODUCT, RFID ANTENNA OF RFID TAG FOR FLEXIBLE MATERIAL PRODUCT, AND RFID ANTENNA CONTINUUM OF SAME

(71) Applicant: SATO HOLDINGS KABUSHIKI KAISHA, Tokyo (JP)

(72) Inventor: Shinya Nitta, Tokyo (JP)

(73) Assignee: SATO HOLDINGS KABUSHIKI KAISHA (JP)

( * ) Notice: Subject to any disclaimer, the term of this patent is extended or adjusted under 35 U.S.C. 154(b) by 0 days.

(21) Appl. No.: 14/353,264

(22) PCT Filed: Oct. 25, 2012

(86) PCT No.: PCT/JP2012/006840
§ 371 (c)(1),
(2) Date: Apr. 21, 2014

(87) PCT Pub. No.: WO2013/061592
PCT Pub. Date: May 2, 2013

(65) Prior Publication Data
US 2014/0291409 A1    Oct. 2, 2014

(30) Foreign Application Priority Data

Oct. 27, 2011   (JP) .................. 2011-235909
Oct. 27, 2011   (JP) .................. 2011-235910

(51) Int. Cl.
*G06K 19/06* (2006.01)
*G06K 19/077* (2006.01)
(Continued)

(52) U.S. Cl.
CPC ............ *G06K 19/07773* (2013.01); *H01Q 1/38* (2013.01); *H01Q 1/2225* (2013.01);
(Continued)

(58) Field of Classification Search
CPC ............. G06K 19/025; G06K 19/027; G06K 19/07718; G06K 19/07758; G06K 19/07773; G06K 19/0779; H01Q 1/2225; H01Q 1/38; H01Q 9/16; H01Q 9/285
USPC .................. 235/385, 435, 439, 487, 492
See application file for complete search history.

(56) References Cited

U.S. PATENT DOCUMENTS

| | | | | |
|---|---|---|---|---|
| 5,856,662 A  * | 1/1999 | Kohama et al. | ................ | 235/492 |
| 7,958,713 B2 * | 6/2011 | Stobbe | ............................. | 57/210 |
| 7,999,683 B2 * | 8/2011 | Fein | ............................ | 340/572.7 |
| 8,339,267 B2 * | 12/2012 | Phaneuf | ..................... | 340/572.8 |

(Continued)

FOREIGN PATENT DOCUMENTS

| | | |
|---|---|---|
| JP | 2006-309401 | 11/2006 |
| JP | 2008-532122 | 8/2008 |

(Continued)

OTHER PUBLICATIONS

International Search Report dated Nov. 27, 2012 issued in corresponding International patent application No. PCT/W2012/006840.

*Primary Examiner* — Seung Lee
(74) *Attorney, Agent, or Firm* — Ostrolenk Faber LLP

(57) ABSTRACT

An RFID tag for and attachable to a flexible material product. The tag includes an RFID antenna that is not susceptible to disconnection, and is close to the flexible material. An RFID antenna for the RFID tag, and there is an RFID antenna continuous body for the RFID tag. The tag base 12 itself is made of a flexible material. An antenna is configured as a conductive thread 14. The RFID tag includes a tag base 12 attachable to a flexible material product. An RFID inlay 15 is capable of performing wireless data communication. The tag base 12 is configured of a flexible material. An RFID antenna 11A includes a base antenna portion 13 configured by integrating the conductive thread 14 into the tag base 12.

20 Claims, 11 Drawing Sheets

(51) Int. Cl.
*H01Q 1/38* (2006.01)
*H01Q 1/22* (2006.01)
*H01Q 9/16* (2006.01)
*G06K 19/02* (2006.01)
*H01Q 9/28* (2006.01)

(52) U.S. Cl.
CPC ............... *H01Q 9/16* (2013.01); *G06K 19/025* (2013.01); *G06K 19/027* (2013.01); *G06K 19/07718* (2013.01); *G06K 19/07758* (2013.01); *H01Q 9/285* (2013.01); *G06K 19/0779* (2013.01)

(56) References Cited

U.S. PATENT DOCUMENTS

| | | |
|---|---|---|
| 2009/0035530 A1* | 2/2009 | Speich .......................... 428/190 |
| 2010/0051699 A1* | 3/2010 | Speich .......................... 235/492 |
| 2011/0147462 A1 | 6/2011 | Speich |
| 2014/0103116 A1* | 4/2014 | Martin et al. ................. 235/488 |

FOREIGN PATENT DOCUMENTS

| | | | |
|---|---|---|---|
| JP | 4548074 | 9/2010 | |
| JP | 2011-15395 | 1/2011 | |
| WO | WO 2006089439 A1 * | 8/2006 | ........... G06K 19/077 |

* cited by examiner

RFID TAG FOR FLEXIBLE MATERIAL PRODUCT, RFID ANTENNA OF RFID TAG FOR FLEXIBLE MATERIAL PRODUCT, AND RFID ANTENNA CONTINUUM OF SAME

CROSS-REFERENCE TO RELATED APPLICATIONS

The present application is a 35 U.S.C. §§371 national phase conversion of PCT/JP2012/006840, filed 25 Oct. 2012, which claims priority of Japanese Patent Application No. 2011-235909, filed Oct. 27, 2011 and Japanese Patent Application No. 2011-235910, filed Oct. 27, 2011, the contents of which are incorporated by reference herein. The PCT International Application was published in the Japanese language.

TECHNICAL FIELD

The present invention relates to use of RFID devices, and particularly flexible material products which use RFID (Radio Frequency Identification) tags, RFID antennas of the RFID tags for providing a flexible material product, and RFID antenna continuous bodies for the RFID tags for providing a flexible material product. The present invention in particular relates to an RFID tag for a flexible material product which is attachable to the flexible material product. Examples of such products include various fabric products, such as clothes and laundry-related products, an RFID antenna of the RFID tag for a flexible material product, and an RFID antenna continuous body for the RFID tag for a flexible material product.

BACKGROUND ART

Conventionally, an RFID tag having an IC chip and an RFID antenna and capable of wirelessly writing or reading data has been utilized for data management of required data in various fields by attaching the tag to an article of various types and reading data relating to the article from the tag and writing various data relating to the article onto the tag.

FIG. 8 is a perspective view illustrating one example of a laundry RFID tag 1 (RFID tag for a flexible material product), which is a conventional RFID tag utilized by being attached to a laundry-related product or other flexible material products of various types. The tag is reusable by cleaning it after its uses in places such as hotels and company offices. The laundry RFID tag 1 includes a tag main body 2 and an RFID module or inlay 3 provided or installed within the tag main body 2.

The tag main body 2 is configured of a material with a required degree of flexibility and rigidity such as an isoprene rubber material formed into a cuboid, in which the RFID inlay 3 is molded.

The RFID inlay 3 includes an inlay base 4 made, for example, of polyethylene terephthalate or a film stack of polyethylene terephthalate, an IC chip 5, and an RFID antenna 6.

The RFID inlay 3 performs reading and writing of data required for the IC chip 5 wirelessly, via the RFID antenna 6 (data communication) based on an electromagnetic effect of radio waves in a predetermined frequency band such as a UHF band (300 MHz to 3 GHz (preferably, 860 MHz to 960 MHz, more specifically, 433 MHz, 900 MHz, 915 MHz to 930 MHz, or 950 MHz to 956 MHz), microwaves (1 GHz to 30 GHz, specifically 2.45 GHz), or an HF band (3 MHz to 30 MHz (preferably, 13.56 MHz)), or at a frequency no higher than 135 kHz.

However, specific configurations of the IC chip 5 and the RFID antenna 6 are adjusted suitably depending on radio waves to be used by each component.

For example, a communication distance of a component using radio waves having a wavelength in the UHF band (e.g., 860 MHz to 960 MHz) is typically on the order of 5 m to 10 m, and an application of such component in various fields is expected.

FIG. 9 is a plan view illustrating the laundry RFID tag 1 attached to a laundry-related product (e.g., a sheet 7) that may be repeatedly used. As shown in a partially-enlarged sectional view of FIG. 9, the laundry RFID tag 1 is attached in such a manner that the laundry RFID tag 1 is contained within an attachment pocket 8 provided at one corner of the sheet 7.

The finished laundry RFID tag 1 thus configured is like a so-called rubber plate, and therefore it produces a feeling of a foreign body to a wearer when the tag is attached to working wear, uniforms, or other clothes. In addition, the laundry RFID tag 1 attached within the attachment pocket 8 poses a problem that the laundry RFID tag 1 gradually becomes exposed so that a portion around the laundry RFID tag 1 or the attachment pocket 8 is susceptible to accumulation of damage during use of the sheet 7, as well as during collection and through steps of cleaning and pressing.

Further, the RFID antenna 6 of the laundry RFID tag 1 is comprised of an extremely-thin metallic foil made of copper, aluminum, or the like, or is formed there by etching or the like. There is a problem that the RFID antenna 6 is susceptible to disconnection. Accordingly, the tag main body 2 is made thick by using a rubber-base material as described above so as to protect the RFID antenna 6.

Therefore, there may be a problem that the laundry RFID tag 1 may not be sewn directly on clothing, a laundry-related product (the sheet 7), or the like. Instead, it requires a secondary component, such as a backing cloth (not depicted), be provided for the sheet 7 or requires secondary processing, such as sewing the tag while it is placed in the attachment pocket 8.

On the other hand, if the tag main body 2 is not made thick, there is a problem that the thin RFID antenna 6 may be easily disconnected due to a stress such as stress caused by bending or twisting in cleaning, possibly resulting in a failure of the laundry RFID tag 1 itself.

Furthermore, when a backing cloth (not depicted) is provided for the sheet 7 or when the secondary processing such as sewing the tag while placed in the attachment pocket 8 is carried out, the entire laundry RFID tag 1 (the tag main body 2) is covered by cloth and such. This poses a problem that it is not possible to attach a visually-seen indication for identification for a backup of information stored in the IC chip 5 to the laundry RFID tag 1 (the tag main body 2).

It should be noted that in order to provide an original design of the RFID antenna 6 unique to a user of the laundry RFID tag 1 on request, an extremely high initial cost is required and a frequency performance of the laundry RFID tag 1 is influenced, and therefore there is another problem that it is difficult to respond to such a request.

CITATION LIST

Patent Literature

PTL 1: Japanese Patent No. 4548074

SUMMARY OF INVENTION

Technical Problem

The present invention has been made in view of the above problems.

An object of the present invention is to provide an RFID tag for a flexible material product which is attachable directly to the flexible material product. Examples of this include various fabric products such as clothes and laundry-related products, soft synthetic resin material products, and leather products, an RFID antenna of the RFID tag for a flexible material product, and an RFID antenna continuous body for the RFID tag for a flexible material product.

Another object of the present invention is to provide an RFID tag for a flexible material product which is easily attachable to the flexible material product, an RFID antenna of the RFID tag for a flexible material product, and an RFID antenna continuous body for the RFID tag for a flexible material product.

Yet another object of the present invention is to provide an RFID tag for a flexible material product which is resistant to a stress such as bending or twisting in cleaning, including for an RFID antenna of the RFID tag for a flexible material product, and an RFID antenna continuous body for the RFID tag for a flexible material product.

Yet another object of the present invention is to provide an RFID tag for a flexible material product and having an RFID antenna that is not susceptible to disconnection and performs data communication without any problem even when disconnection occurs, including for an RFID antenna of the RFID tag for a flexible material product, and an RFID antenna continuous body for the RFID tag for a flexible material product.

Yet another object of the present invention is to provide an RFID tag for a flexible material product, wherein the tag is extremely close to the flexible material and is exceptionally durable, including for an RFID antenna of the RFID tag for a flexible material product, and an RFID antenna continuous body for the RFID tag for a flexible material product.

Yet another object of the present invention is to provide an RFID tag for a flexible material product which is capable of realizing reduction of costs for materials, improvement of workability of the materials, and improvement of mass productivity, including for an RFID antenna of the RFID tag for a flexible material product, and an RFID antenna continuous body for the RFID tag for a flexible material product.

Yet another object of the present invention is to provide an RFID tag for a flexible material product which tag may easily indicate identification for a backup of information and which provides high flexibility in a design of an RFID antenna, such an RFID antenna of the RFID tag for a flexible material product, and an RFID antenna continuous body for the RFID tag for a flexible material product.

Solution to Problem

Thus, the present invention focuses on a configuration in which the RFID antenna itself is made of a flexible material such as a fabric material, specifically, a configuration in which a tag base itself is made of a flexible material such as a fabric material or the like, and a configuration in which an antenna itself is configured by a conductive thread.

A first aspect of the invention is an RFID tag for a flexible material product, the tag including: a tag base attachable to the flexible material product; and an RFID inlay or module provided for the tag base, having an IC chip and an RFID antenna, and capable of performing wireless data communication, wherein the tag base is comprised of a flexible material, and the RFID antenna includes a base antenna portion configured by integrating a conductive thread into the tag base.

A second aspect of the invention is an RFID antenna of an RFID tag for a flexible material product, the tag having a tag base attachable to the flexible material product and being capable of performing wireless data communication, wherein the tag base is comprised of a flexible material, and the RFID antenna is configured by integrating a conductive thread into the tag base.

A third aspect of the invention is an RFID antenna of an RFID tag for a flexible material product, the tag including: a tag base attachable to the flexible material product; and an RFID inlay provided for the tag base, the inlay having an IC chip and an RFID antenna, wherein the tag is capable of performing wireless data communication, wherein the tag base is comprised of a flexible material, and the RFID antenna is configured by integrating a conductive thread into the tag base.

A fourth aspect of the invention is an RFID antenna continuous body for an RFID tag for a flexible material product, the tag having a tag base attachable to the flexible material product and the tag being capable of performing wireless data communication, wherein the tag base is comprised of a strip-shaped flexible material, the RFID antenna continuous body is comprises a plurality of base antenna portions, each in a required antenna pattern, and the antenna sections are successively and repeatedly produced by integrating a conductive thread into the tag base, and the tag base is separable into sections so as to separate the base antenna portions from each other.

The RFID inlay or module may include: the IC chip; an inlay antenna portion connected to the IC chip; and a protecting member configured to protect the inlay antenna portion and the IC chip.

The protecting member may be comprised of a glass epoxy resin.

The RFID antenna may be configured to work in electromagnetic cooperation with the inlay antenna portion included in the RFID inlay.

The base antenna portion and the inlay antenna portion may be electromagnetically couplable.

The flexible material may be a fabric material.

The conductive thread may be integrated into the tag base by one of weaving and sewing.

The RFID inlay may be fixable to the tag base by an adhesive agent.

The RFID inlay may be attachable to an attachment pocket provided for the tag base.

The RFID inlay may be sewable on the tag base.

The RFID antenna may include a base antenna portion configured by integrating the conductive thread into the tag base.

The RFID inlay may include: the IC chip; and an inlay antenna portion connected to the IC chip, and the base antenna portion and the inlay antenna portion may be electromagnetically couplable.

Advantageous Effects of Invention

According to an RFID tag for a flexible material product, the RFID antenna of the RFID tag for a flexible material product, and the RFID antenna continuous body for the RFID tag for a flexible material product of the present invention, the tag base is comprised of a flexible material, such as a fabric material or the like, the RFID antenna is configured by integrating the conductive thread into the tag base using a common processing treatment, such as weaving or sewing, and whereby non-contact data communication is enabled. Therefore, no sense of discomfort is provided and a stress is unlikely to occur when the tag is attached to a flexible material product, such as clothing. Thus, possibility of damages to the RFID antenna itself is reduced, and durability equivalent to that of the flexible material product may be provided.

In particular, the RFID antenna of an RFID tag for a flexible material product of the second aspect of the invention may be provided with a simple processing treatment, as the tag base is comprised of a flexible material, and the conductive thread is integrated into the tag base.

In particular, the RFID antenna of an RFID tag for a flexible material product of the third aspect of the invention may perform wireless data communication in electromagnetic cooperation with the RFID inlay included in the RFID tag for a flexible material product, as the tag base is comprised of a flexible material, and the conductive thread is integrated into the tag base.

In particular, according to the RFID antenna continuous body for the RFID tag for a flexible material product of the fourth aspect of the invention, the tag base is comprised of a strip-shaped flexible material, the plurality of base antenna portions each in a required antenna pattern are provided successively and repeatedly by integrating the conductive thread into the tag base, and the tag base is separable into sections so as to separate base antenna portions from each other. Therefore, it is possible to provide the RFID antenna of a portion length having a predetermined antenna pattern extremely easily.

DESCRIPTION OF EMBODIMENTS

According to the present invention, an RFID antenna is comprised of and configured by a tag base made of a flexible material and a conductive thread integral with the tag base. Therefore, the RFID antenna itself is made of a fabric. This defines an RFID tag for a flexible material product that is suitable for data communication through processing. This is accomplished, e.g. by direct sewing a tag on a flexible material product, such as clothing. An RFID antenna of the RFID tag is provided for a flexible material product, and an RFID antenna continuous body for the RFID tag for a flexible material product is provided.

Example

Figure 8:
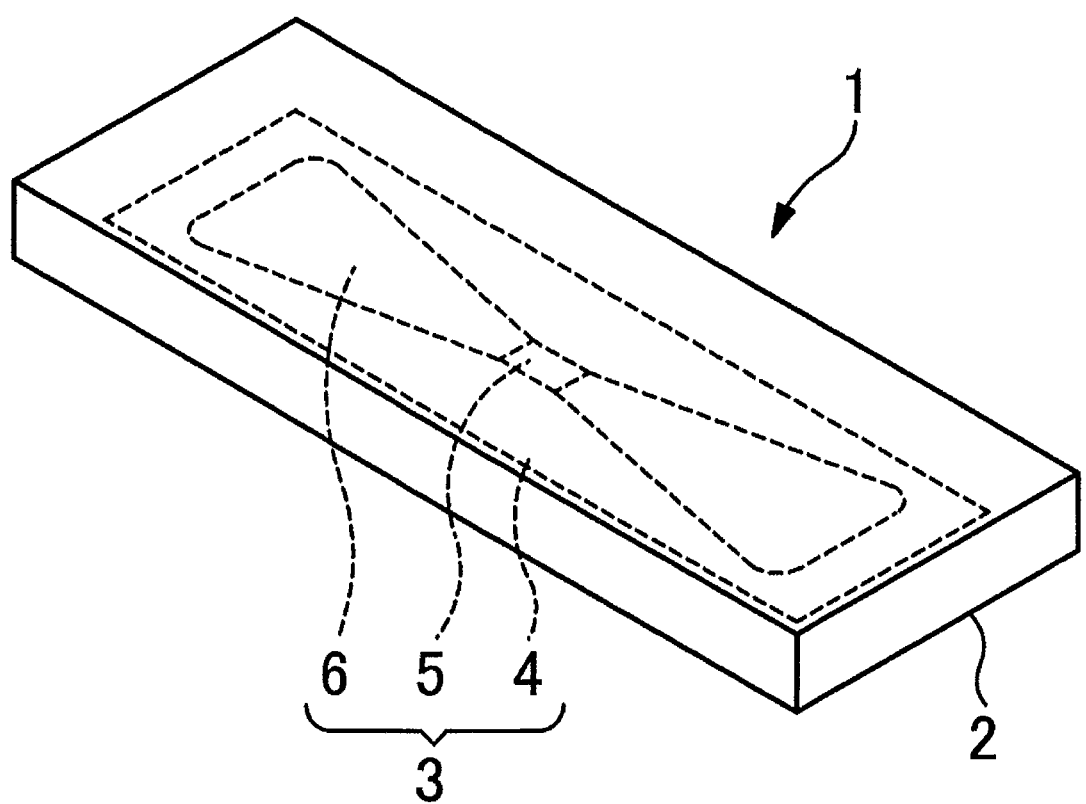
FIG. 8 is a perspective view illustrating one example of a laundry RFID tag 1 (RFID tag for a flexible material product), which is a conventional RFID tag utilized by being attached to a laundry-related product (flexible material product) one of various types, that is reusable by cleaning after use in places, such as hotels and company offices.
Figure 9:
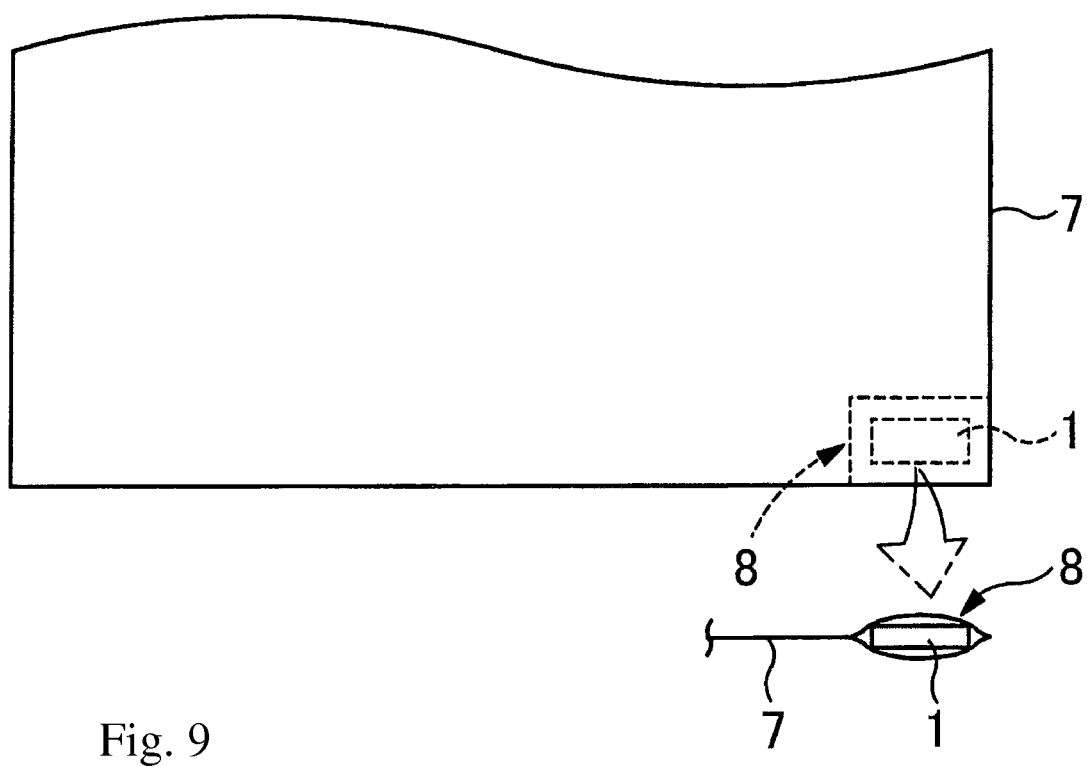
FIG. 9 is a partial plan view illustrating the laundry RFID tag 1 attached to a laundry-related product (e.g., the sheet 7) that is repeatedly used.

Hereinafter, an RFID antenna 11A and an RFID antenna continuous body 11, as well as an RFID tag 10 for a flexible material product comprised of these components according to an embodiment of the present invention will be described with reference to FIG. 1 through FIG. 7. However, like components in the prior art, as illustrated in FIG. 8 and FIG. 9, are denoted by like reference numerals and detailed descriptions of these components shall be omitted.

Figure 1:
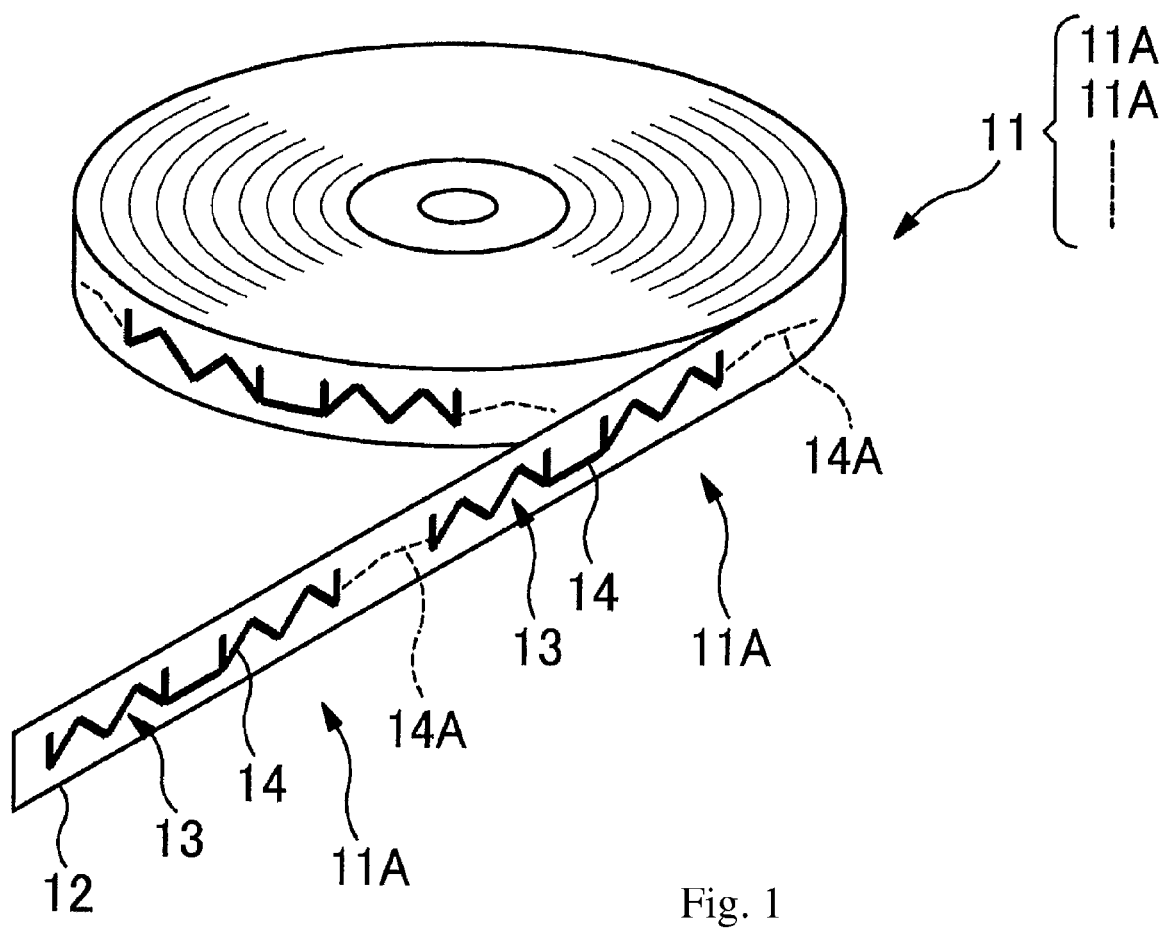
FIG. 1 is a perspective view illustrating an embodiment of an RFID antenna continuous body 11 for configuring an RFID tag 10 for a flexible material product according to an embodiment of the present invention.
Figure 2:
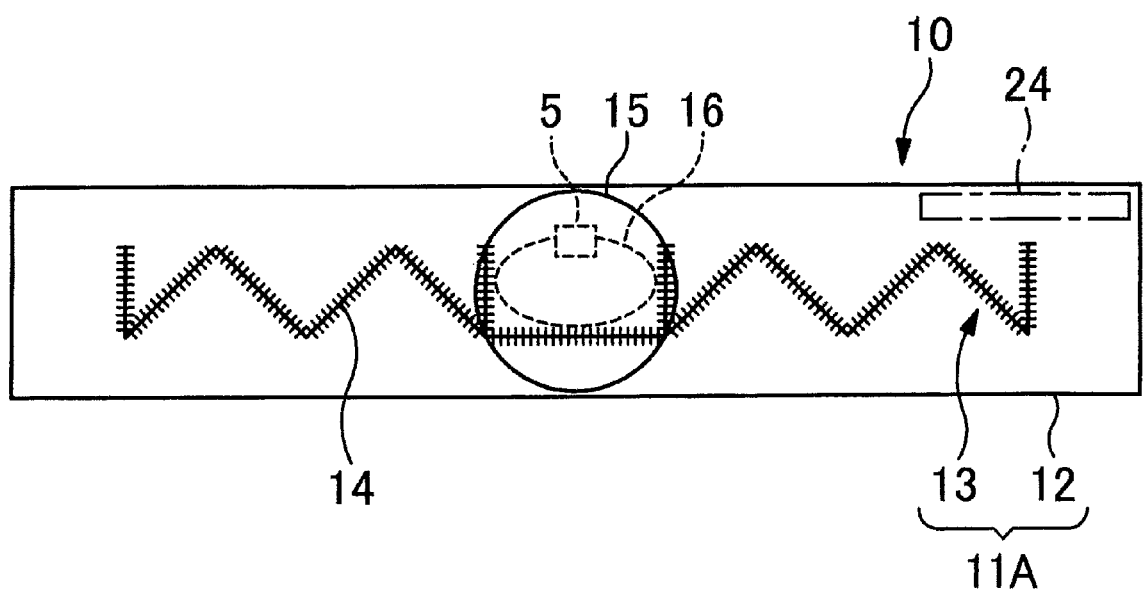
FIG. 2 is a plan view illustrating the RFID tag 10 for a flexible material product according to the embodiment of the present invention.
Figure 3:
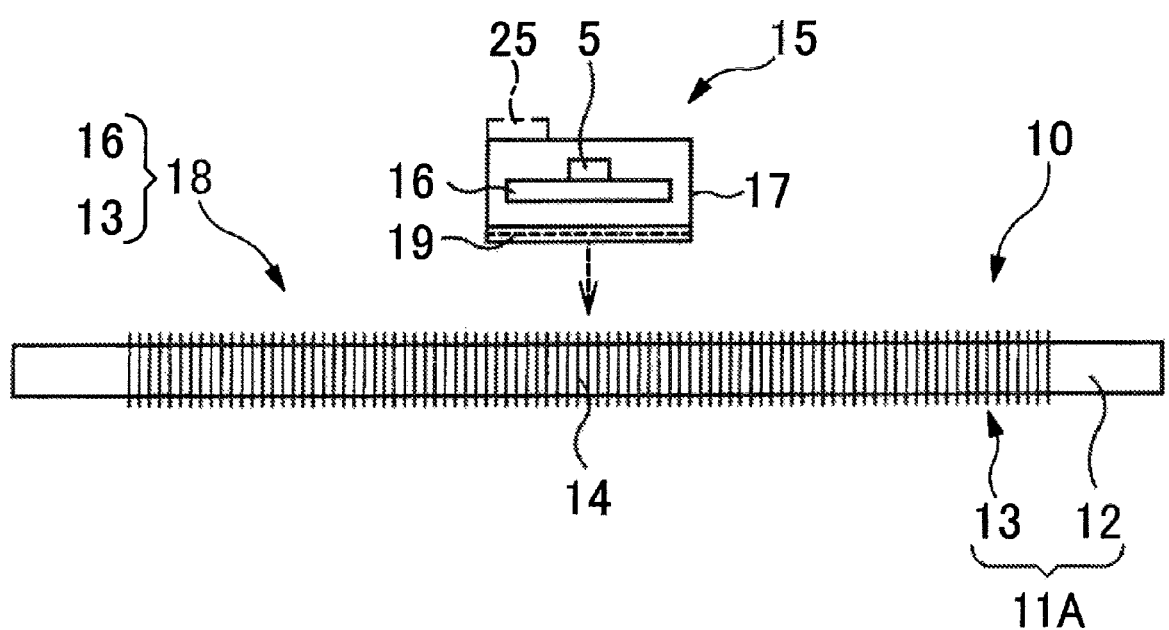
FIG. 3 is a sectional view illustrating the RFID tag 10 for a flexible material product according to the embodiment of the present invention.

FIG. 1 is a perspective view illustrating the RFID antenna continuous body 11 for configuring the RFID tag 10 for a flexible material product that is capable of performing wireless data communication, FIG. 2 is a plan view illustrating the RFID tag 10 for a flexible material product, and FIG. 3 is a sectional view illustrating the RFID tag 10 for a flexible material product.

The RFID antenna continuous body 11 includes a strip-shaped tag base 12 and a plurality of base antenna portions 13 each in a required antenna pattern for use in a respective RFID tag.

The tag base 12 is comprised of a strip-shaped flexible material such as a fabric material, a soft synthetic resin material, or a leather material. The base may be attached to a flexible material product, such as a fabric product, in a clothing item or a sheet 7, a soft synthetic resin material product, a leather product, or the like, by a method such as sewing, weaving, adhesion, or the like.

The tag base 12 may have any thickness (but is usually relatively thin) depending on a use condition or a usage pattern of the RFID tag 10 for a flexible material product, and the tag base may be made of a material the same as or different from that of the flexible material product.

Each of the plurality of base antenna portions 13 is provided in an antenna pattern of an arbitrarily required design. The antenna patterns are provided successively and repeatedly by integrating a conductive thread 14 into the tag base 12 by weaving or sewing.

For example, when the conductive thread 14 is sewn on the tag base 12 like a stitch work by sewing, the plurality of base antenna portions 13 may be easily provided successively by typical sewing, while connection threads 14A of the conductive thread 14 are disposed on a back side of the tag base 12 as shown by a dashed line in FIG. 1.

In addition, it is possible to sew the conductive thread 14 at an optionally set sewing density, that is, at an optionally set degree of closeness between adjacent parts of the conductive thread 14 of a single antenna portion 13 of a single tag. By closely sewing the conductive thread 14, even if a part of the thread is disconnected, a contact state between the disconnected parts of the conductive thread 14 may be maintained. Therefore, it is possible to prevent trouble in the data communication.

According to the RFID antenna continuous body 11 thus configured, after the base antenna portions 13 are integrated into the tag base 12, the tag base 12 may be cut so as to separate portions of the tag base including the base antenna portions 13 from each other, for example, by a predetermined length (that is, a length required for the RFID tag 10 for a flexible material product). The cuts may be made at portions of the connection threads 14A. It is easy to provide the RFID antenna 11A of a unit length configured by integrating the conductive thread 14 into the tag base 12.

As illustrated specifically in FIG. 2 and FIG. 3, the RFID tag 10 for a flexible material product includes the RFID antenna 11A having the tag base 12 and the base antenna portion 13, and an RFID inlay or module 15. In FIG. 3, for a portion of the conductive thread 14, a section along a sewing line is shown.

The RFID inlay 15 is attached to the tag base 12 (i.e., the RFID antenna 11A) and serves as a core RFID tag material or a near-field inlay material. The RFID inlay 15 includes an IC chip 5, an inlay antenna portion 16 connected to the IC chip 5, and a protecting member 17 for protecting the inlay antenna portion 16 and the IC chip 5. The inlay is able to perform wireless data communication.

The inlay antenna portion 16 is comprised of copper, aluminum, or the like. The base antenna portion 13 by the conductive thread 14 and the inlay antenna portion 16 may be electromagnetically coupled (coupling of radio waves) especially when the radio waves in use are high-frequency waves in the UHF band or the like, and enable non-contact data communication by the RFID tag 10 for a flexible material product as a whole.

Specifically, the inlay antenna portion 16 included in the RFID inlay 15 serves as an internal antenna portion, and the base antenna portion 13 included in the tag base 12 (the RFID antenna 11A) serves as an external antenna portion. An RFID antenna portion 18 as the RFID tag 10 for a flexible material product as a whole includes the inlay antenna portion 16 and the base antenna portion 13, and the RFID antenna 11A (the base antenna portion 13) and is able to work in electromagnetic cooperation with the inlay antenna portion 16 included in the RFID inlay 15.

The protecting member 17 may be comprised of any hard material, such as a glass epoxy resin, in a circular disk shape in the example shown in FIG. 2, and may protect the IC chip 5 and the inlay antenna portion 16 from an external force of various types that may be exerted on the RFID inlay 15 and in turn on the RFID antenna 11A as a whole.

As illustrated specifically in FIG. 3, the RFID inlay 15 is fixed to the tag base 12 (the RFID antenna 11A), for example, by an adhesive agent 19, to form the RFID tag 10 for a flexible material product.

Figure 4:
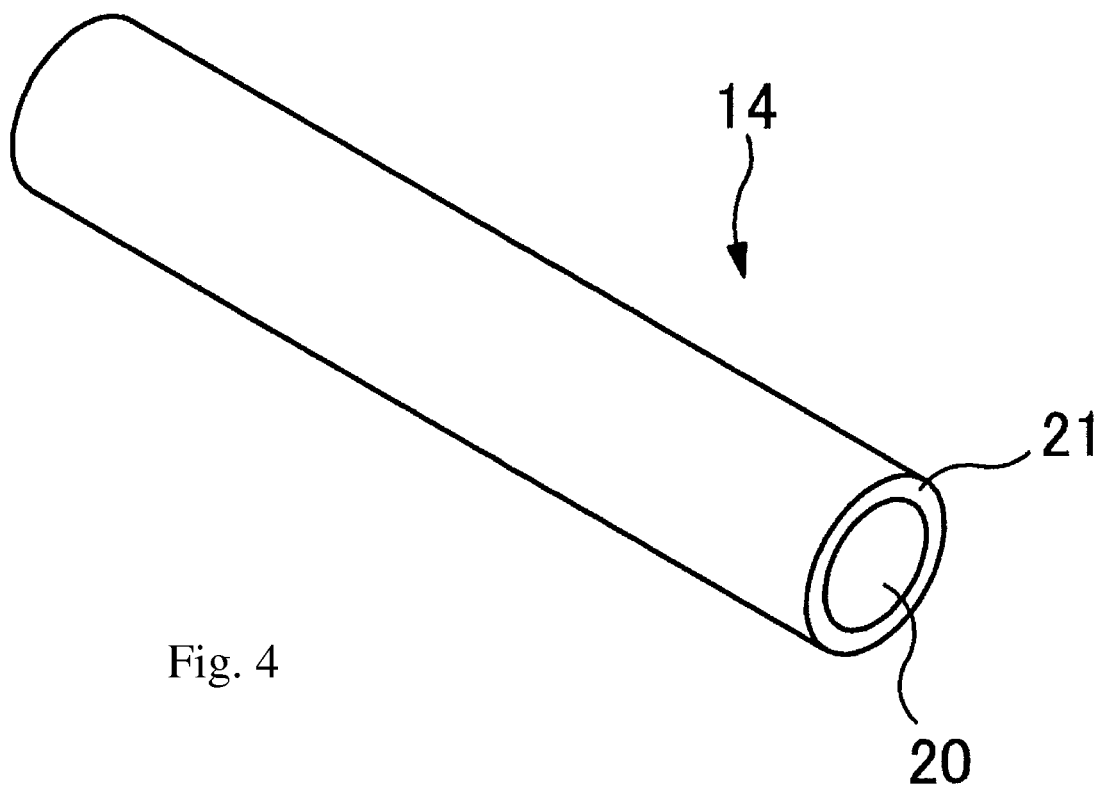
FIG. 4 is an enlarged perspective view illustrating a conductive thread 14 according to the embodiment of the present invention.

FIG. 4 is an enlarged perspective view illustrating the conductive thread 14. The conductive thread 14 is configured such that a fiber thread 20 made of polyester, acrylic, or the like is integrated with a metal 21 such as copper or nickel to provide electrical conductivity and flexibility, such integration by a method such as plating, printing, or winding, and may be integrated into the tag base 12 by weaving or sewing in a predetermined antenna pattern, as described above.

Figure 5:
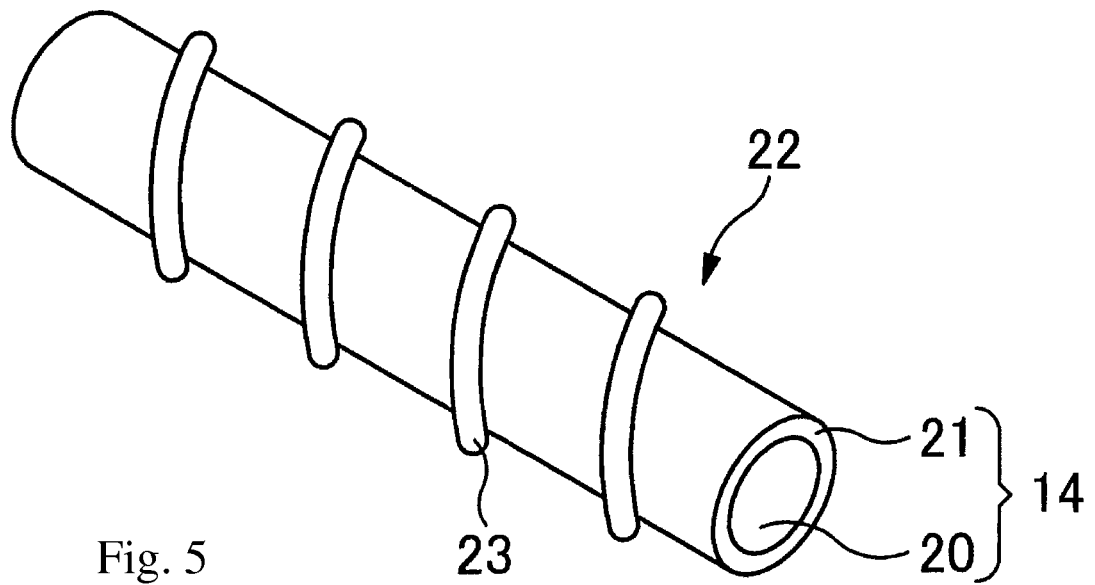
FIG. 5 is an enlarged perspective view illustrating another configuration of the conductive thread 14 (a reinforced conductive thread 22) according to another embodiment of the present invention.

Further, FIG. 5 is an enlarged perspective view illustrating another configuration example of a conductive thread 14 (reinforced conductive thread 22). The conductive thread 14 resists tension caused by weaving or sewing, for example, by a polyester thread 23 helically wound around a circumferential surface of the conductive thread 14, as needed.

As illustrated in FIG. 2, it is possible to show a first identification indication 24 as a code such as a bar code, a sign, or visibly seen letters and signs on the tag base 12 to supply information for backing up various data stored in the IC chip 5, or else to similarly show a second identification indication 25 on the protecting member 17 of the RFID inlay 15.

According to the RFID tag 10 for a flexible material product and the RFID antenna continuous body 11 thus configured, as the conductive thread 14 is integrated into the tag base 12 to provide the base antenna portion 13 (the RFID antenna 11A), and as such a configuration may be achieved by simple weaving or sewing, it is possible to provide the RFID antenna continuous body 11 and the RFID antenna 11A extremely easily.

In addition, by simply providing the RFID inlay 15 for the RFID antenna 11A (the tag base 12) so that the RFID inlay 15 and the RFID antenna 11A (the base antenna portion 13) are close to each other, it is possible to allow a non-contact data communication function of the RFID tag 10 for a flexible material product to be fully delivered.

Further, as the tag base 12 itself is made of a flexible material that is the same as or different from that of the flexible material product such as a fabric material including the sheet 7, or the like, when the tag is attached to the sheet 7, the RFID tag 10 for a flexible material product is integrated with the cloth and maintains its durability under stress, such as bending or like, to an extent similar to the cloth.

As the RFID inlay 15 is protected by the protecting member 17, it is possible to prevent the IC chip 5 and the inlay antenna portion 16 provided within the inlay from being damaged or being disconnected.

It should be appreciated that by employing a material that is soft and rigid other than the glass epoxy resin as the protecting member 17, it is possible to deliver a further flexible protecting function, as well as to expand a range of application of the RFID tag 10 for a flexible material product.

As described above, the base antenna portion 13 (the conductive thread 14) of the RFID antenna 11A is not susceptible to disconnection. However, even if a part of the conductive thread 14 is disconnected, electromagnetic coupling (coupling of radio waves) with each other may be maintained especially when the radio waves in use are high-frequency waves in the UHF band or the like, and there is no difficulty in achieving non-contact data communication of the RFID tag 10 for a flexible material product as a whole.

However, as the base antenna portion 13 is provided as a stitch work of the conductive thread 14, even when a part of the conductive thread 14 is disconnected, the conduction is maintained if the disconnected portions of the conductive thread 14 are in contact with each other across the disconnection, and it is rare occurrence that conduction of the base antenna portion 13 as a whole is impaired.

Further, even when disconnection of the base antenna portion 13 occurs, the non-contact data communication function itself may not be lost even though its gain decreases, as the RFID inlay 15 itself includes the IC chip 5 and the inlay antenna portion 16.

Moreover, the RFID tag 10 for a flexible material product may be attached to an attachment target such as, and not limited to, a fabric material such as the sheet 7 or clothing, a product made of a flexible synthetic resin material, a leather material, or the like of various types, and therefore a use target of the RFID tag 10 for a flexible material product may be optionally selected.

Furthermore, a formation pattern of the base antenna portion 13 (the RFID antenna 11A) by the conductive thread 14 may be optionally selected according to a usage mode, depending on radio waves to be used such as a dipole-type antenna pattern, a coiled pattern, or the like. In addition, the antenna pattern may be of an optional design on user's request. Processing for such a purpose may be weaving or sewing as described above, and it is possible to obtain an antenna pattern that is highly flexible, and excellent in workability and mass productivity.

Further, any optional configuration may be employed as an attachment configuration of the RFID tag 10 for a flexible material product to the flexible material product such as the sheet 7.

Figure 6:
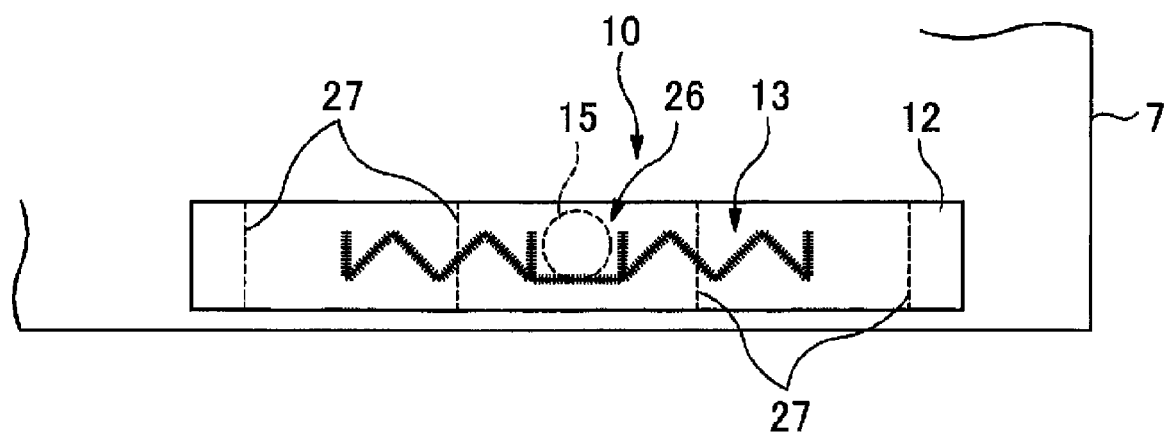
FIG. 6 is a partial plan view illustrating a configuration in which an RFID inlay 15 is attached to an attachment pocket 26 provided for an RFID antenna 11A (a tag base 12) which is to be attached to a sheet 7 according to the embodiment of the present invention.

FIG. 6, for example, is a partial plan view of a configuration in which the RFID inlay 15 is attached to an attachment pocket 26 provided for the RFID antenna 11A (the tag base 12) to be attached to the sheet 7.

Figure 6A:
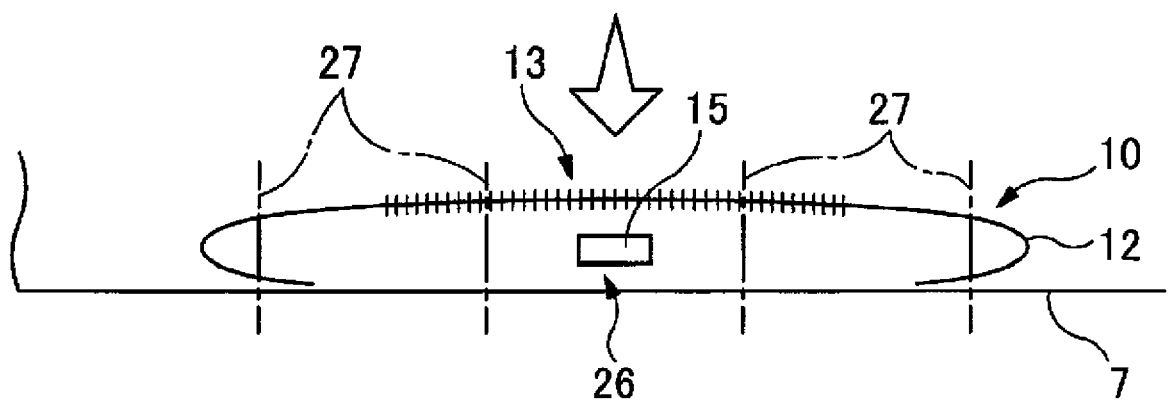
FIG. 6A is a sectional view thereof.

As shown specifically in a partially-enlarged sectional view FIG. 6A, by sewing the tag base 12 of the RFID tag 10 for a flexible material product on the sheet 7 by a sewing thread 27, providing the attachment pocket 26 for the RFID antenna 11A (the tag base 12) by the sewing thread 27, and placing and fixing the RFID inlay 15 in and to the attachment pocket 26 so as to become closer to the base antenna portion 13 of the RFID antenna 11A, it is possible to cause the RFID tag 10 for a flexible material product, as the tag is, to deliver the data communication function.

According to this attachment configuration, the RFID inlay 15 may be simply placed in the RFID antenna 11A (the attachment pocket 26) without using the adhesive agent 19 or the like for integration with the RFID antenna 11A (FIG. 3).

Figure 7:
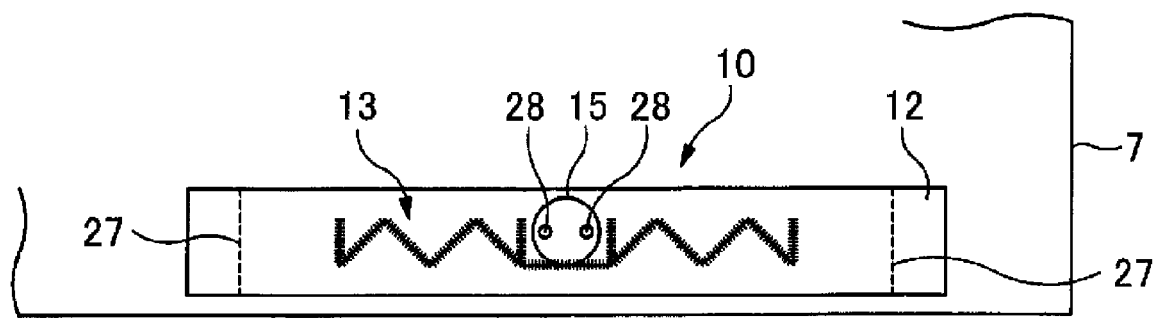
FIG. 7 is a partial plan view illustrating a configuration in which the RFID inlay 15 is sewn along with the RFID antenna 11A (the tag base 12) to be attached to the sheet 7 according to the embodiment of the present invention.

FIG. 7 is a partial plan view of a configuration in which the RFID inlay 15 is sewn along with the RFID antenna 11A (the tag base 12) to be attached to the sheet 7.

Figure 7A:
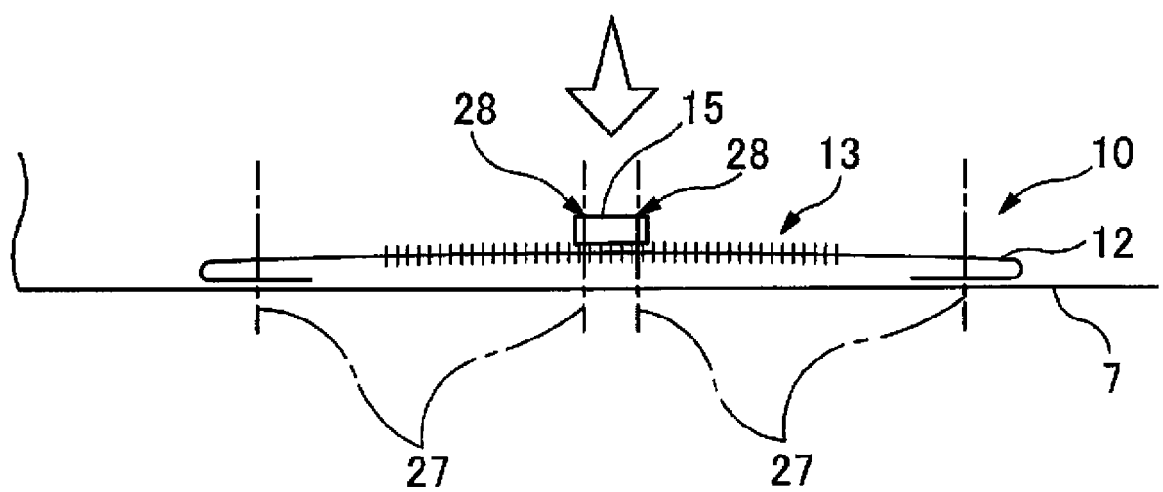
FIG. 7A is a section view thereof.

As shown specifically in a partially-enlarged sectional view FIG. 7A, a sewing hole 28 like a buttonhole is previously provided in the protecting member 17 of the RFID inlay 15, and the RFID inlay 15 may be sewn on the tag base 12 along with the RFID antenna 11A by the sewing thread 27.

According to this attachment configuration, it is possible to attach the RFID antenna 11A and the RFID inlay 15 to the sheet 7 at the same time and in the sewing step of the RFID antenna 11A to the sheet 7, and the attachment process may be performed in a highly efficient manner.

REFERENCE SIGNS LIST

1: Laundry RFID Tag (Conventional Example, FIG. 8)
2: Tag Main Body
3: RFID Inlay
4: Inlay Base
5: IC Chip
6: RFID Antenna
7: Sheet (Laundry-Related Product, Flexible Material Product, FIG. 9)
8: Attachment Pocket
10: RFID Tag for Flexible Material Product (Embodiment, FIG. 2, FIG. 3)
11: RFID Antenna Continuous Body (FIG. 1)
11A: RFID Antenna of Unit Length Separated from RFID Antenna Continuous Body 11 (Embodiment, FIG. 2, FIG. 3)
12: Tag Base
13: Base Antenna Portion
14: Conductive Thread
14A: Connection Thread of Conductive Thread 14 (FIG. 1)
15: RFID Inlay
16: Inlay Antenna Portion
17: Protecting Member
18: RFID Antenna Portion
19: Adhesive Agent
20: Fiber Thread Made of Polyester, Acrylic, or the like
21: Metal such as Copper or Nickel
22: Reinforced Conductive Thread (Conductive Thread)
23: Polyester Thread
24: First Identification Indication
25: Second Identification Indication
26: Attachment Pocket (FIG. 6)
27: Sewing Thread
28: Sewing Hole (FIG. 7)

The invention claimed is:

1. An RFID tag for a flexible material product, the tag comprising:
    a tag base attachable to a flexible material product;
    the tag base is comprised of a flexible material;
    an RFID inlay provided for the tag base, the inlay having an IC chip and an inlay antenna connected to the IC chip, so that the inlay is capable of performing wireless data communication; and
    a base antenna portion comprised of a conductive thread integrated into the tag base,
    wherein the IC chip and the inlay antenna are enclosed in a protecting member and fixed to the tag base.

2. The RFID tag for a flexible material product according to claim 1, wherein the protecting member is comprised of a glass epoxy resin.

3. The RFID tag for a flexible material product according to claim 1, wherein the base antenna portion is configured to operate in electromagnetic and wireless cooperation with the inlay antenna included in the RFID inlay.

4. The RFID tag for a flexible material product according to claim 1, wherein the base antenna portion and the inlay antenna are electromagnetically, and wirelessly couplable.

5. The RFID tag for a flexible material product according to claim 1, wherein the flexible material of the tag base comprises a fabric material.

6. The RFID tag for a flexible material product according to claim 1, wherein the conductive thread is integrated into the tag base by one of weaving and sewing.

7. The RFID tag for a flexible material product according to claim 1, wherein the RFID inlay is fixed to the tag base by an adhesive agent.

8. The RFID tag for a flexible material product according to claim 1, further comprising an attachment pocket; and
    the RFID inlay is attachable to the attachment pocket provided for receiving the tag base.

9. The RFID tag for a flexible material product according to claim 1, wherein the RFID inlay is attachable on the tag base.

10. An RFID antenna of an RFID tag for a flexible material product, the tag comprising:
    a tag base is comprised of a flexible material;
    the tag base is attachable to a flexible material product; and
    an RFID inlay provided at the tag base, the inlay having an IC chip and an inlay antenna, and being configured for performing wireless data communication; and
    an RFID antenna comprised of a conductive thread integrated into the tag base.

11. The RFID antenna of an RFID tag for a flexible material product according to claim 10, wherein the RFID inlay further includes a protecting member configured and located to protect the inlay antenna portion and the IC chip.

12. The RFID antenna of an RFID tag for a flexible material product according to claim 10, wherein the RFID antenna and the inlay antenna portion are electromagnetically couplable.

13. The RFID antenna of an RFID tag for a flexible material product according to claim 10, wherein the flexible material is a fabric material.

14. The RFID antenna of an RFID tag for a flexible material product according to claim 10, wherein the conductive thread is integrated into the tag base by one of weaving and sewing.

15. The RFID antenna of an RFID tag for a flexible material product according to claim 10, wherein the RFID inlay is fixed to the tag base by an adhesive agent.

16. The RFID antenna of an RFID tag for a flexible material product according to claim 10, further comprising:
   an attachment pocket on the tag base; and
   the RFID inlay is attachable to the attachment pocket provided for the tag base.

17. The RFID antenna of an RFID tag for a flexible material product according to claim 10, wherein the RFID inlay is sewn on the tag base.

18. An RFID antenna continuous body for an RFID tag for a flexible material product, comprising:
   a tag having a tag base attachable to a flexible material product, and the tag being configured for performing wireless data communication;
   the tag base is comprised of a strip-shaped flexible material;
   an RFID antenna continuous body comprised of a plurality of base antenna portions, each base antenna portion being in an antenna pattern, successively and repeatedly, and each antenna portion comprising a conductive thread integrated into the tag base and connected to another successive antenna portion by a conductive connection thread, and
   the tag base is separable, at a location corresponding to a conductive connection thread, into portions, each portion including an antenna portion, thereby to separate successive ones of the base antenna portions from each other.

19. An RFID tag for a flexible material product, the tag comprising:
   a tag base attachable to a flexible material product;
   the tag base is comprised of a flexible material;
   an RFID inlay provided for the tag base, the inlay having an IC chip and an RFID antenna, so that the inlay is capable of performing wireless data communication, wherein
   the RFID antenna includes a base antenna portion comprised of a conductive thread integrated into the tag base, and further comprising an attachment pocket; and
   the RFID inlay is attachable to the attachment pocket provided for receiving the tag base.

20. An RFID antenna of an RFID tag for a flexible material product, the tag comprising:
   a tag base is comprised of a flexible material;
   the tag base is attachable to a flexible material product; and
   an RFID inlay provided at the tag base, the inlay having an IC chip and an RFID antenna, and being configured for performing wireless data communication;
   an attachment pocket on the tag base;
   wherein the RFID inlay is attachable to the attachment pocket provided for the tag base; and
   the RFID antenna is comprised of a conductive thread integrated into the tag base.

* * * * *